United States Patent
Carr et al.

(10) Patent No.: US 9,582,718 B1
(45) Date of Patent: Feb. 28, 2017

(54) METHOD AND DEVICE FOR MULTI-TARGET TRACKING BY COUPLING MULTIPLE DETECTION SOURCES

(71) Applicant: Disney Enterprises, Inc., Burbank, CA (US)

(72) Inventors: George Peter Carr, Burbank, CA (US); Hamid Izadinia, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 14/754,938

(22) Filed: Jun. 30, 2015

(51) Int. Cl.
*G06K 9/00* (2006.01)
*G06T 11/20* (2006.01)
*G06K 9/52* (2006.01)

(52) U.S. Cl.
CPC ..... *G06K 9/00624* (2013.01); *G06K 9/00342* (2013.01); *G06K 9/52* (2013.01); *G06T 11/206* (2013.01)

(58) Field of Classification Search
None
See application file for complete search history.

(56) References Cited

U.S. PATENT DOCUMENTS

2015/0142716 A1* 5/2015 Lucey ............... G06N 5/022
706/46

OTHER PUBLICATIONS

Yihang Bo; Hao Jiang, "Scale and Rotation Invariant Approach to Tracking Human Body Part Regions in Videos", 2013 IEEE Conference on Computer Vision and Pattern Recognition Workshops, 2013, pp. 1041-1047, DOI:10.1109/CVPRW.2013.151.*

* cited by examiner

*Primary Examiner* — Atiba O Fitzpatrick
(74) *Attorney, Agent, or Firm* — Fay Kaplun & Marcin, LLP

(57) ABSTRACT

A device and method for receiving first detection information for a plurality of objects, the first detection information relating to a first characteristic of the objects, receiving second detection information for the objects, the second detection information relating to a second characteristic of the objects, determining first detections based upon the first detection information and second detections based upon the second detection information, formulating trellis graphs for the first and second detections, each trellis graph graphs including corresponding nodes at a plurality of time frames and determining a tracking of a selected one of the objects based upon a simultaneous shortest path for the selected object through both the first and second trellis graphs based upon a first path through the first trellis graph, a second path through the second trellis graph, and sidekick information.

20 Claims, 15 Drawing Sheets

Results Table
1100

| Method | $P_{miss}$ | $P_{fa}$ | Precision | Recall | $N_{misses}$ | $N_{gtframes}$ | Avg length | Purity | MOTA |
|---|---|---|---|---|---|---|---|---|---|
| Basketball1 | | | | | | | | | |
| Head | 0.401 | 0.241 | 0.713 | 0.599 | 0.210 | 1.504 | 2.348 | 0.964 | 0.357 |
| Body | 0.536 | 0.229 | 0.670 | 0.464 | 0.080 | 1.233 | 2.280 | 0.986 | 0.235 |
| Combined | 0.208 | 0.714 | 0.526 | 0.792 | 0.541 | 2.105 | 2.855 | 0.943 | 0.074 |
| Joint HB | 0.242 | 0.380 | 0.666 | 0.758 | 0.210 | 1.473 | 3.070 | 0.933 | 0.377 |
| N-heads DP | 0.280 | 0.299 | 0.706 | 0.720 | 0.331 | 1.894 | 2.757 | 0.967 | 0.418 |
| Basketball2 | | | | | | | | | |
| Head | 0.283 | 0.168 | 0.810 | 0.717 | 0.073 | 1.456 | 1.878 | 0.985 | 0.548 |
| Body | 0.524 | 0.201 | 0.703 | 0.476 | 0.073 | 0.728 | 2.259 | 0.970 | 0.274 |
| Combined | 0.114 | 0.570 | 0.609 | 0.886 | 0.121 | 1.383 | 2.339 | 0.970 | 0.315 |
| Joint HB | 0.135 | 0.437 | 0.700 | 0.798 | 0.146 | 1.165 | 2.635 | 0.938 | 0.426 |
| N-heads DP | 0.202 | 0.342 | 0.664 | 0.865 | 0.194 | 1.456 | 2.440 | 0.963 | 0.454 |
| TownCentre | | | | | | | | | |
| Head | 0.430 | 0.058 | 0.907 | 0.570 | 0.913 | 5.858 | 4.000 | 0.966 | 0.511 |
| Body | 0.397 | 0.087 | 0.874 | 0.603 | 1.683 | 8.715 | 3.224 | 0.943 | 0.514 |
| Combined | 0.194 | 0.316 | 0.718 | 0.806 | 2.218 | 9.302 | 4.551 | 0.940 | 0.488 |
| Joint HB | 0.214 | 0.177 | 0.816 | 0.786 | 1.696 | 6.432 | 5.047 | 0.937 | 0.607 |
| N-heads DP | 0.250 | 0.118 | 0.864 | 0.750 | 1.761 | 8.206 | 5.740 | 0.948 | 0.630 |
| PETS09 | | | | | | | | | |
| Head | 0.275 | 0.052 | 0.933 | 0.725 | 1.420 | 6.720 | 8.363 | 0.929 | 0.670 |
| Body | 0.157 | 0.025 | 0.971 | 0.843 | 1.420 | 6.530 | 9.061 | 0.932 | 0.815 |
| Combined | 0.076 | 0.427 | 0.684 | 0.924 | 2.271 | 6.625 | 11.210 | 0.926 | 0.492 |
| Joint HB | 0.115 | 0.060 | 0.936 | 0.885 | 1.609 | 4.921 | 11.533 | 0.931 | 0.821 |
| N-heads DP | 0.149 | 0.035 | 0.960 | 0.851 | 1.514 | 6.246 | 10.027 | 0.923 | 0.812 |

Fig. 11

METHOD AND DEVICE FOR MULTI-TARGET TRACKING BY COUPLING MULTIPLE DETECTION SOURCES

BACKGROUND INFORMATION

The tracking of an object may provide information for a variety of different applications. One particular environment in which object tracking is performed is a multi-target environment. For example, a sports event may utilize tracking in which the objects may be people (e.g., athletes, referees, etc.), a ball, etc. In another example, a town center region may utilize tracking in which the objects may be people. However, tracking multiple targets interacting in close proximity is a difficult problem due to each object not always being visible or isolated. That is, the objects may be occluded or occlude one another from object detectors.

A variety of approaches have been used for tracking these objects in the multi-target environment. A first type of tracking includes using only one type of information.

Specifically, this first type (tracking-by-detection) uses complete or full object detectors. Those skilled in the art will understand that full-object detectors have an increased number of criteria to determine whether an object has been detected. Accordingly, full-object detectors may result in an increased number of missed detections, particularly in a multi-target environment. Furthermore, although the entirety of an object may not be occluded, the parameters used to determine an object may prevent the full object detectors from tracking the object, thereby further increasing the number of missed detections.

To accommodate for this drawback, a second type of tracking also includes using only one type of information. Specifically, this second type includes tracking objects by detecting (and possibly tracking) portions of an object to overcome the above noted difficulties associated with full or complete object detections. Specifically, parts of the object (e.g., head of a person) may remain visible more often than the full body. With less constricting parameters to determine a portion of an object, a detection may still result. However, because parts are smaller and often less discriminative, the number of false detections increases. A part-object detector may have settings such that a generally spherically shaped object having a size within a target range corresponds to a head of a person. However, there may be objects that also have this criteria. For example, a basketball is spherical and may be within the target range.

Further approaches have been developed in which one type of information is used to support another type of information in tracking an object. A third type of tracking thus includes using part-based information. Specifically, tracking-by-detection approaches use complete or full object detectors and attempt to interpolate through missing detections using motion priors. With part-based information (e.g., head detections), a tracking algorithm may ensure any hypothesized association between complete object detections (which may span implied missed detections) is at least supported by partial object information. Alternatively, if multiple parts are detected in each frame, the tracking algorithm may determine if there is enough partial evidence to justify a full object detection. For example, the object may still be sufficiently occluded to prevent the complete object detector from resulting as a positive determination but the partial based information may corroborate that the complete object detection indeed exists. It should be noted that an opposite use of partial information may also be used. For example, false detections from part-based detection information may be removed as positive detections based upon full body detection information.

Despite the use of a further type of information potentially overcoming some drawbacks, in both of the above described situations, partial object information may only be evaluated on a per-frame basis to justify either creating a missed complete object detection or supporting the association of two temporally separated detections which imply one or more missed detections therebetween. As a result, even though multiple types or modes of information may be used in the tracking process, greedy decisions are made early so that the data association step only needs to deal with a single homogenous type of information, most typically full object detections. That is, even with a second type of information being used, ultimately only a single type of information is utilized in tracking an object.

FIG. 2A shows a first set of exemplary body detections 200. Using this manner of determining body detections, the body detections 200 include positive detections 205, missed detections 210, and false detections 215. Specifically, the body detections 200 are in the ground plane in which a projection is made from a position of the feet of a person and a hallucinated head at a predetermined height, such as 1.5 meters above the feet in the image plane. In this particular scene, almost all desired objects have been detected resulting in positive detections 205. However, at least two objects are not detected resulting in the missed detections 210. Although unlikely when detecting the body due to the greater criteria being required, an uninvolved person may also be detected to result in a false detection 215. As such, it is clear that even under more optimal circumstances, the single homogeneous type of information utilizing body detections only, has its drawbacks.

FIG. 2B shows a second set of exemplary body detections 225. The same manner used in determining the body detections 200 in FIG. 2A may be used in determining the body detections 225. In this scene, the body detections 225 again may include the positive detections 205, the missed detections 210, and the false detections 215. However, this scene may represent sub-optimal circumstances to utilize the body detections 225. As can be seen in FIG. 2B, only one position detection 205 is determined. However, all other objects are not detected to result in a high number of missed detections 210. As such, it is further evident that the single homogeneous type of information utilizing body detections only has further drawbacks dependent on the circumstances in which the detections are to be determined.

The above scenes using the body detections 200, 225 illustrate that this method struggles with occlusions and that visual feature based approaches have difficulty, particularly with complex body poses. The criteria in determining a body detection may be greater than when determining, for example, a head detection. The criteria may include the body detection resulting only when the body is within a bounding box. The bounding box may be substantially rectangular that is predetermined based upon a person's body when standing upright. The first scene including the body detections 200 in FIG. 2A illustrates that the people are generally in an upright posture and separate from each other. Thus, there is a relatively high number of positive detections 205. However, the second scene including the body detections 225 in FIG. 2B illustrates that most of the people are not in the upright posture and are not separated from each other, thereby occluding one another. Thus, there is a relatively high number of missed detections 210.

In a more specific embodiment, the detection results that employ three-dimensional geometric primitives to find human-like foreground regions may be used. The bodies may be detected by finding cylinders with plausible width and height for a single person that when projected into the image may match the foreground silhouette. This detector may have high precision with reasonable recall. However, again, it is vulnerable to occlusion and different body postures. For example, if multiple athletes are in proximity of each other and make a single large foreground region, the algorithm may be unable to detect each body of the athletes. Similarly, if a person bends over such that the foreground region is not the same size as the standing person, the detector may again fail. These situations make achieving a high recall difficult.

In view of the drawbacks associated with using only body detections and the probability of having an increased number of missed detections 210, further approaches focused on tracking particular body parts may also be used for tracking purposes. One example of another body part may be the head. The tracking of the other body parts may be based on visual features such as Histograms of Oriented Gradients (HOGs) or edgelets, which may be considered a series of connected pixels that form an edge of an object or portion of an object. Those skilled in the art will understand that part detectors tend to have increased detections but that these detections may have increased false detections.

FIG. 2C shows a first set of exemplary head detections 250. Using this manner of determining head detections, the head detections 250 include positive detections 255, missed detections 260, and false detections 265. Specifically, the head detections 250 may be determined based upon a bounding box. In a first example, the bounding box may be for only the head. In a second example, the bounding box may be for the head and the shoulders. This scene may be the same scene discussed above for the body detections 200 of FIG. 2A. However, when detecting heads, this scene may have an increased number of missed detections 260 due to the heads being cluttered by background (e.g., colors, shapes, etc.). Thus, this illustrates how, in some circumstances, using body detections may still be preferable over head detections. Furthermore, the increased false detections 265 may result simply from a reflection on the floor of an overhanging light source. As such, it is clear that the single homogeneous type of information, utilizing head detections only, has its drawbacks.

FIG. 2D shows a second set of exemplary head detections 275. Again, the head detections 275 may include positive detections 255, missed detections 260, and false detections 265. The manner discussed above with the head detections 250 using the bounding box may again be used. This scene may be the same scene discussed above for the body detections 225 of FIG. 2B. However, when detecting heads in this instance, there is an increased number of detections and positive detections 255. In contrast to the scene of FIG. 2C, there is little to no interference by the background such that the number of positive detections 255 increases. Furthermore, there are no missed detections 260 or false detections 265 in this scene. Therefore, this illustrates how using head detections, in other circumstances, may be far more preferable over body detections. As such, it is evident that the single homogeneous type of information is inconsistent and depends on a variety of factors to improve the number of detections.

In view of the above discussion, the selection of using the single homogeneous type of detection information as body detections or head detections is highly dependent upon the circumstances in which the detections are to be determined. In comparing a single scene with the body detections 200 of FIG. 2A and the head detections 250 of FIG. 2C, the type of detections may be substantially similar. However, in comparing a single scene with the body detections 225 of FIG. 2B and the head detections 275 of FIG. 2D, it is clear that the head detections are preferable when occlusion rates are high. Although the bodies may be occluded, the heads are still visible such that the number of positive detections is also increased. Nevertheless, there is still a greater likelihood of having missed and false detections when relying only on this single type of information throughout.

The body detection information and the head detection information that is generated from the methods described above may be used to generate trajectory information. More specifically, trellis graphs may be formulated from the body detection information and the head detection information. Generally, trellis graphs are graphs including nodes that are ordered into vertical slices. Each node at each time is connected to at least one node at an earlier time and at least one node at a later time. The first or start (S) time and the last or terminating (T) time in the trellis graph may have only one node. For simplicity, the first and last time frames are omitted from a sequential numbering scheme as will be used herein.

FIG. 3A shows a first trellis graph 300 incorporating a single homogeneous type of information. The trellis graph 300 shows a plurality of detections (i.e., vertical slices) along the y-axis for each unit of time represented along the x-axis. The trellis graph 300 represents how the body detection information or the head detection information may be formulated into a trellis graph. As shown in FIG. 3A, there may be a varying number of detections for all frames (e.g., time). As such, there are discrete time steps and a finite, fixed number of steps. Given this basis, a search may be performed to determine a tracking of an object based on a set of body detections or head detections. The track may be the shortest path through the trellis graph 300 that only considers transitions from a first time t−1 to a second time t. The trellis graph 300 shows one such shortest path. It should be noted that further transitions may be considered such as from t−2 to t which implicitly includes a cost of a missed detection at t−1.

FIG. 3B shows a second trellis graph 305 incorporating only body detection information. That is, the body detection nodes are represented as circles. FIG. 3C shows a third trellis graph 350 incorporating only head detection information. That is, the nodes are represented as squares. As discussed above, the trellis graph may include interconnections to nodes prior and subsequent to the respective time unit. Since the trellis graphs 305, 350 relate to using only body detection information or only head detection information, the discrete and finite characteristics may remain. Therefore, each interior node (i.e., non-edge node) at time t is shown as connecting to each subsequent node of the time t+1. Furthermore, Dijkstra's algorithm may be applied to each trellis graph 305, 350 to determine a shortest path 310, 355, respectively, to track a desired person either through the head or the body, respectively.

As discussed above, the tracking of an object may provide information for subsequent processes such as determining a trajectory of the object via the trajectory engine 135. FIG. 4A shows a first set of determined trajectories 400 based upon homogeneous object tracking information. FIG. 4B shows a second set of determined trajectories 450 based upon homogeneous object tracking information. Thus, the head or body detection information may provide tracking information such that trajectory information may be generated. In FIG. 4A, a trajectory 415 may be determined from a start position 405 to an end position 410. In FIG. 4B, a trajectory 465 may be determined from a start position 455 to an end position 460; a trajectory 480 may be determined from a start position 470 to an end position 475; and a trajectory 495 may be determined from a start position 485 to an end position 490.

FIG. 5A shows trajectory results 500 based upon head only homogeneous object tracking information. FIG. 5B shows trajectory results 550 based upon body only homogeneous object tracking information. As discussed above, the head detection information may provide improved precision and recall. The results 500 and 550 illustrate how the head detection information indeed provides this improved precision and recall. Specifically, the output trajectories in the trajectory results 500 are longer which leads to the greater precision and recall. However, again, this still may not be within a desired range of precision and recall. Thus, by improving the tracking information that forms the basis of generating the trajectory results, the trajectory results may also be improved.

A part based detector may be trained for head and shoulder detection. Each of the head, left shoulder, and right shoulder are modeled by a HOG filter and its binary displacements are modeled by a quadratic function of displacement in the x and y directions. An implementation of articulated pose estimation with flexible mixtures of parts may be used and modified for training the detectors. Each part may contain a mixture model corresponding to different postures of the part. The weight of the HOG filters and displacements may be learned by structured Support Vector Machines (SVM). A conventional dataset such as the "Leeds Sports" pose dataset may be used to train the detectors since a similar variety of head and shoulder postures exist in the illustrated scenes discussed above.

When the information from body detectors has been received, further processing of this information may be performed. Specifically, the entire objects are directly detected. Those skilled in the art may understand this approach as a "root" filter in deformable part models (DPMs). Frames may be processed either independently by extracting visual features such as HOG or sequentially through background subtraction based measurements.

One manner of potentially taking advantage of body detection information and head detection information is based on DPM in which the two approaches are combined such that a root filter searches for the whole body and its confidence is combined with multiple part filters connected to the root filter using spring-like potentials. Although the DPM may have provided an improvement over root-only and part-only approaches, there is still difficulty with occlusion and vastly different body poses.

These methods use a variety of detection techniques to produce a homogeneous set of detections typically of the full body which may be determined either directly or by fusing multiple parts. Therefore, the data association tracking algorithm is unable to rectify any incorrect fusion of parts when estimating the existence of a full body detection. Another approach included tracking both parts and complete object detections. However, online tracking is performed and greedy assignment algorithms are used to associate parts to objects as well as tracking objects across consecutive frames. Still further, part and full body detections in an offline data association tracking framework may be used. Specifically, an approximate inference algorithm may be employed that first generates full body tracklets and then the inferred parts for each full body detection. If the parts trackers do not give significant support for a full body tracklet, the tracklet is split. The full body detections are merged using network flow to ensure each full body tracklet has a consistent set of part tracklets.

Once the body detection information and the head detection information has been generated, normalized cross correlation may be used to track each head patch for a short period of time (e.g., one second). In this way, short temporal gaps may be completed if, for example, a head is not detected for a few frames. For the body detections, a Hungarian algorithm may be used to make short term associations between frames for a short batch of frames. After computing short trajectories of both heads and bodies, the velocity of each target may be estimated using a constant velocity model for a predetermined number of consecutive frames (e.g., five consecutive frames).

Subsequently, greedy consecutive shortest path methods may be used to estimate the long term associations of heads and bodies in isolation. Such isolation of heads and bodies were described above with regard to the trellis graph 305 for the bodies and the trellis graph 310 for the heads. This method first finds a shortest path through a network. In a subsequent iteration, the nodes in the previous path are removed from the network and the next shortest path is found in the remaining graph. This iterative method is greedy and assumes that previous paths are all correct and optimum. Thus, if the current shortest path makes a mistake in an iteration, it cannot correct a previous path in future iterations.

BRIEF DESCRIPTION OF THE DRAWINGS

FIG. 11 shows numerical results of object tracking based upon different tracking algorithms according to an exemplary embodiment.

DETAILED DESCRIPTION

Figure 1:
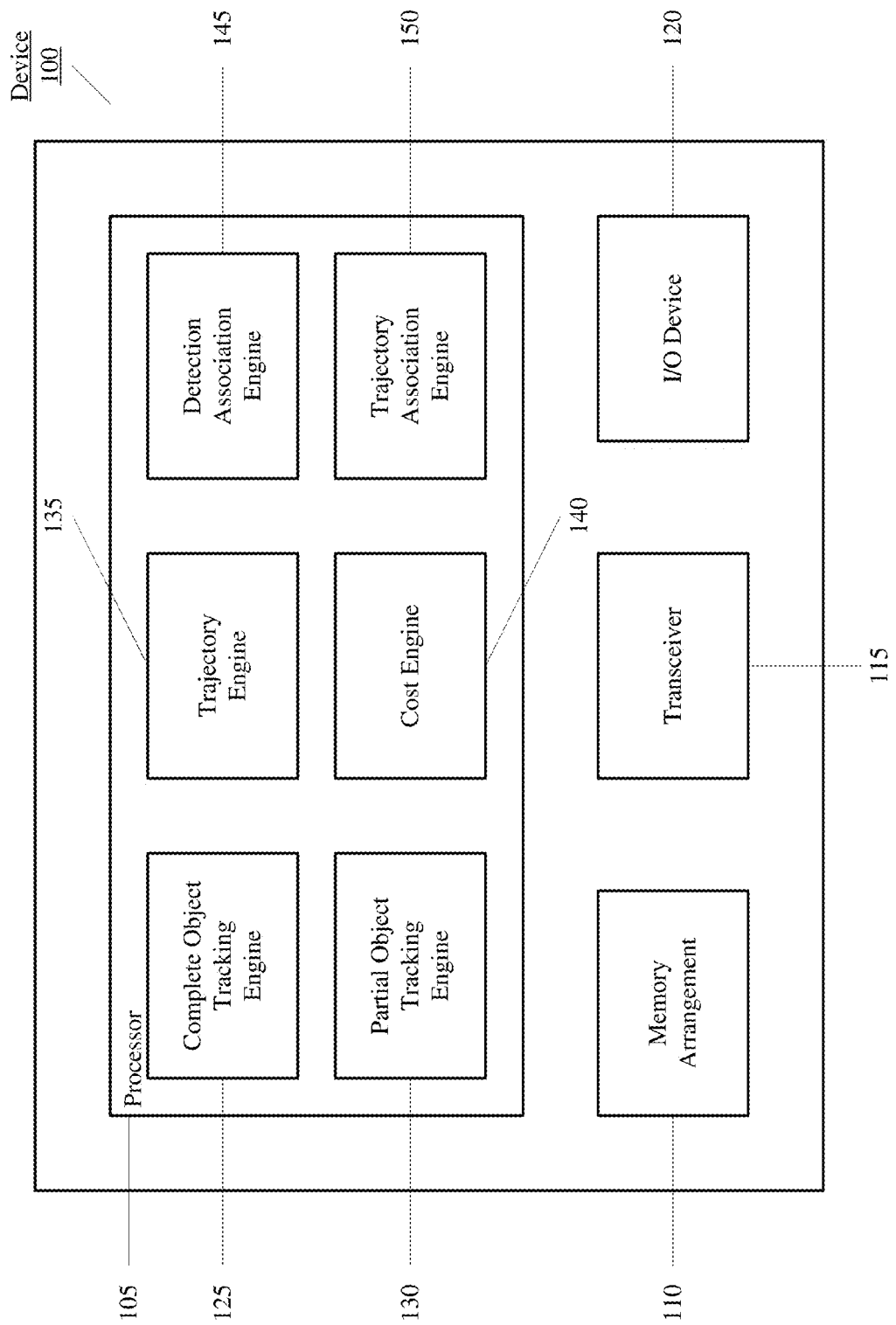
FIG. 1 shows a device for determining a tracking of an object according to an exemplary embodiment.

The present disclosure relates to a device and method for receiving first detection information for a plurality of objects, the first detection information relating to a first characteristic of the objects, receiving second detection information for the objects, the second detection information relating to a second characteristic of the objects, determining first detections based upon the first detection information and second detections based upon the second detection information, formulating a first trellis graph for the first detections and a second trellis graph for the second detections, the first and second trellis graphs including corresponding first and second nodes at a plurality of time frames and determining a tracking of a selected one of the objects based upon a simultaneous shortest path for the selected object through both the first and second trellis graphs based upon a first path through the first trellis graph, a second path through the second trellis graph, and sidekick information between a selected node of one of the first and second trellis graphs at a selected time frame with at least one node of the other one of the first and second trellis graphs at a previous time frame. In one exemplary embodiment, the method is embodied in an executable program stored in a non-transitory computer readable storage medium.

The exemplary embodiments may be further understood with reference to the following description and the appended drawings, wherein like elements are referred to with the same reference numerals. The exemplary embodiments describe a method and device for determining a track of an object in a multi-target tracking environment. Specifically, the method and device combines partial and complete object detections in a fusion strategy such that the improvements in part-based tracking may be utilized without the conventional drawbacks associated therewith such as an increase in false detections. The tracking, the multi-target tacking environment, the partial and complete object detections, the combination thereof, the improvements, and a related method will be described in further detail below.

Initially, it is noted that the term detection used herein may relate to either a single instance (e.g., (x, y)) or a short "tracklet" consisting of multiple instances. Those skilled in the art will therefore understand that the exemplary embodiments are directed toward linking together short spatio-temporal fragments to construct longer spatio-temporal tracks either from using single frame detections, multi-frame tracklets, or a combination thereof.

The exemplary embodiments utilize the advantages from using both partial and complete object detections while overcoming drawbacks associated with each. Furthermore, the exemplary embodiments also overcome the drawbacks of relying upon a per-frame basis and ultimate use of homogeneous information. As will be described in further detail below, decisions regarding partial object information may be delayed until a data association stage where temporal consistency of object parts may be considered. Thus, a heterogeneous data association problem results that combines both full or complete detections and part detections. That is, the delay enables the removal of the dependencies on a per-frame basis and on using a single homogeneous type of information.

More specifically, trellis graphs are formulated for both the partial detections and the complete detections. As will be detailed below, the optimal tracking solution for a single object is not necessarily the shortest paths through each trellis graph. Instead, the exemplary embodiments relate to determining a partial object trajectory and a full object trajectory that track each other. That is, the bounding box of the partial object should remain in roughly the same location relative to the bounding box of the complete object. In one exemplary embodiment, an N-heads inference algorithm from Coupled Hidden Markov Models are modified to produce a pair of trajectories that remain mostly parallel while simultaneously traversing both trellis graphs. Therefore, the tracking of the object may be obtained from tracking the objects through the respective trellis graphs but also tracking each other through the trellis graphs. As a result, temporal stability may be incorporated when deciding if there is sufficient part-based evidence to justify continuing a track (or terminating the track) when there is no corresponding complete object detection. Alternatively, the trellis graphs may be analyzed in an isolated and iterative fashion. The solution to one trellis may be used to modify the second trellis graph, and the solution to the modified second trellis graph may be used to modify the first trellis graph. The process may be repeated until convergence. Results of the exemplary embodiments will also be described in further detail below which illustrate how coupled trellis graphs according to the exemplary embodiments may outperform conventional methods of object tracking such as traditional per-frame data fusion approaches.

FIG. 1 shows a device 100 for determining a tracking of an object according to an exemplary embodiment. The device 100 may be any electronic component that is configured to receive and process data such that the determining is performed. The device 100 may be embodied as a single device that incorporates the variety of components. The device 100 may also be embodied as a system of devices including a plurality of devices that are interconnected in which data may be exchanged therebetween. The device 100 may also be connected to further devices or to a network to receive/transmit information from these further devices. For example, these further devices may be object detectors such as a partial object detector, a complete object detector, etc. that transmit information to the device 100. In another example, these further devices may be cameras that receive trajectory information from the device 100 to determine a manner in which the cameras are to move.

The device 100 may include a processor 105, a memory arrangement 110, a transceiver 115, and an input/output (I/O) device 120. The processor 105 may be configured to execute a plurality of applications including control applications for the components to be used. The memory arrangement 110 may store data that is received as well as data that is determined. The transceiver 115 and the I/O device 120 may provide a communicative connection to other electronic devices or users such that data may be received for processing. For example, a user may enter a desired object to be tracked, may manually input information to be used in determining the tracking of an object, etc.

The processor 105 may further execute a plurality of engines that are configured to perform a functionality associated with determining a tracking of an object. As illustrated, the processor 105 may execute a complete object tracking engine 125, a partial object tracking engine 130, a trajectory engine 135, a cost engine 140, a detection association engine 145, and a trajectory association engine 150. The engines will be described in further detail below. It should be noted that the engines 125-150 may be embodied in a variety of different manners. For example, the engines 125-150 may be applications executed by the processor 105, may be separate incorporated components of the device 100, or may be modular components coupled to the device 100, for example, an integrated circuit with or without firmware.

The complete object tracking engine 125 and the partial object tracking engine 130 may each receive information from respective detectors. Specifically, the complete object tracking engine 125 may receive complete object information from a complete object detector whereas the partial object tracking engine 130 may receive partial object information from a partial object detector. For illustrative purposes, the exemplary embodiments are described with regard to objects being people. Thus, the complete object tracking engine 125 may receive information on the full body of the person while the partial object tracking engine 130 may receive information on the head of the person. Accordingly, the complete object is used herein interchangeably with a body and the partial object is used herein interchangeably with a head. However, it should be noted that the use of people as the objects is for illustrative purposes only and the exemplary embodiments may be applied to any object tracking in which the object may have any complete shape and any partial shape thereof.

As described above, there are a variety of approaches to visually track people including body detection tracking and head detection tracking. The device 100 may be configured to further provide determining the tracking of people using these approaches. Thus, the body information from the body detectors may be provided to the complete object tracking engine 125 and the head information from the head detectors may be provided to the partial object tracking engine 130. The tracking algorithms, trajectory determinations, and optimal determinations may be performed by the complete object tracking engine 125 and the partial object tracking engine 130 in combination with the trajectory engine 135 and the cost engine 140. Specifically, the algorithms to be used may be the above described tracking-by-detection methodology in which people or heads are independently detected in each video frame and a post-processing data association algorithm links detections from multiple frames into object trajectories.

As described above, there are manners of improving a confidence of a first type of detection information based upon a second type of detection information. However, the following exemplary embodiments provide an improved manner of overcoming the lower recall of body detections by incorporating the higher recall of the head detector. Specifically, the head information and the body information are associated in some manner via the data association engine 145, without drastically lowering the high precision of the full body detector (which is generally more discriminative than the head only detector).

Figure 6:
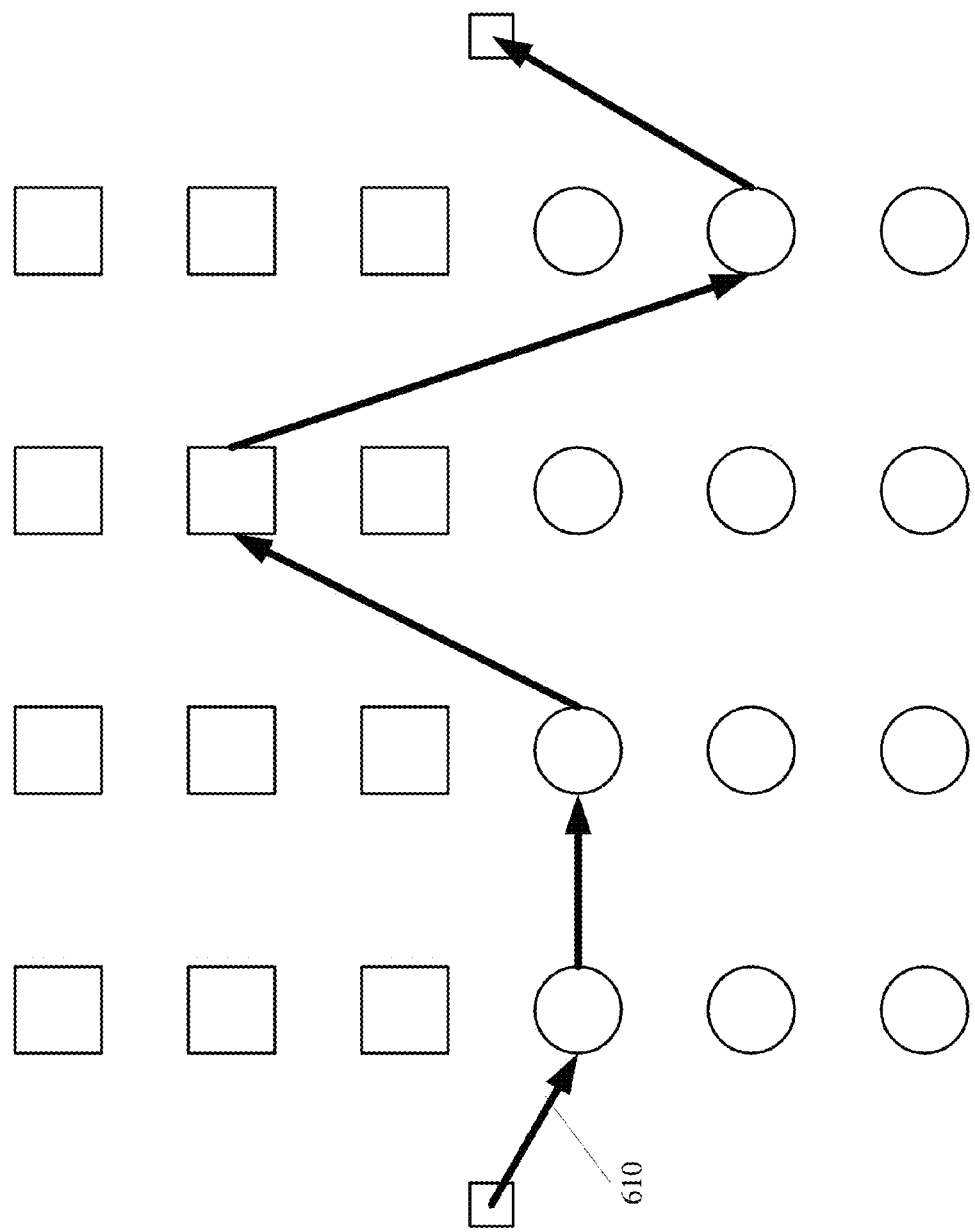
FIG. 6 shows a first combination trellis graph incorporating independent head detection and body detection information according to an exemplary embodiment.

FIG. 6 shows a first combination trellis graph 600 incorporating heterogeneous information by combining the sets of head and body detections. As used above, the head detections may be represented with squares whereas the body detections may be represented with circles. A shortest path 610 through the trellis graph may be performed in a conventional manner. Thus, the shortest path 610 may traverse through either a head detection or body detection at each time, but not both. As shown, although only a single type of detection is traversed at a given time, the shortest path 610 may include both head detections and body detections along its path. For example, at a first time, a body detection is traversed; at a second time, another body detection is traversed; at a third time, a head detection is traversed; and at a fourth time, a further body detection is traversed. Once a path is found, all head nodes and all body nodes which may be explained by the shortest path are removed from the graph before a subsequent shortest path is performed.

Figure 7:
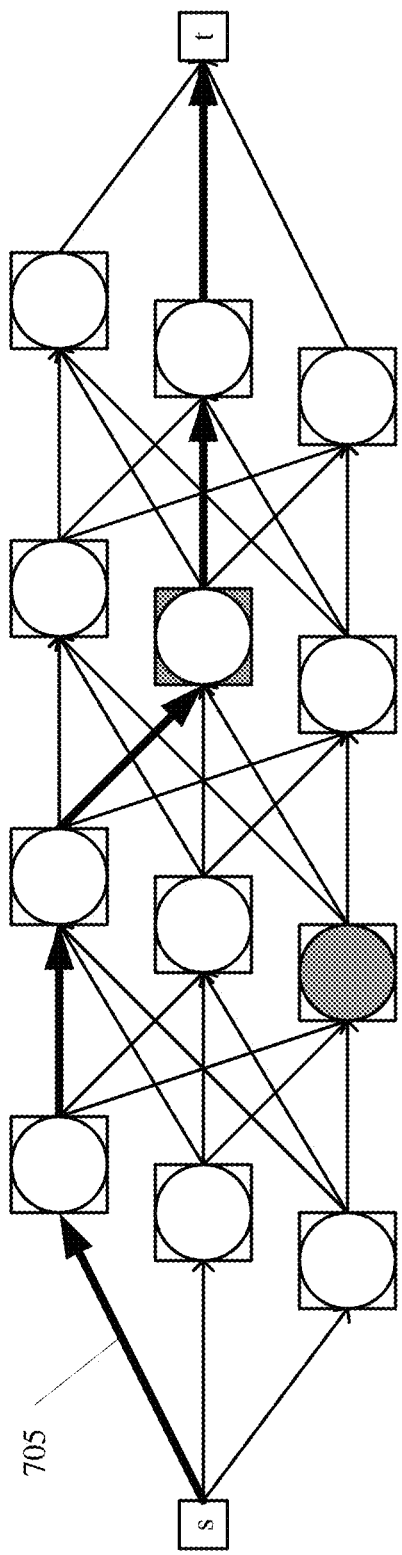
FIG. 7 shows a second combination trellis graph incorporating fused head and body detection information according to an exemplary embodiment.

FIG. 7 shows a second combination trellis graph 700 using homogeneous information. Each node may represent either a single head detection (white circle on grey square), single body detection (grey circle on white square), or simultaneous head/body detection (white circle on white square). The graph 700 may be constructed by first matching head/body detections at each time instant. For each body detection, there is a corresponding expected position of the head. An n×(n+m) cost matrix may be formulated between the n head detections and m body detections at time t. The first (n×m) elements of the matrix are determined by the distance (in the image plane) between the nth head detection and the nth expected head location based on the body detection. The remaining n×n matrix elements have a diagonal structure with a maximum tolerable displacement along the diagonal, and infinity in the off diagonal elements. An optimal matching of head detections to body detections (and vice versa) including "no viable pairing" is computed using the Hungarian algorithm. The results of the matching at time t are used to generate the nodes in the vertical slice of the trellis graph at time t. Additionally, head-only and body-only nodes include additional costs for having a missed body or head detection respectively. Once the trellis graph is formulated, an object is tracked by finding the shortest path through the trellis graph.

As discussed above, the costs associating with traversing from a first node to a second node depends on the identity of the nodes themselves. Thus, a lowest cost traversal includes a head/body node to a head/body node denoted as $c_{ij}^{hb,hb}=c_{ij}^{hh}+c_{ij}^{bb}$ where $\gamma$ is a cost of a missed detection; a second lowest cost traversal includes a head only node to a head/body node denoted as $c_{ij}^{h\bar{b},hb}=c_{ij}^{hh}+\gamma^{\bar{b}}$; a second highest cost traversal includes a body only node to a head/body node denoted as $c_{ij}^{\bar{h}b,hb}=c_{ij}^{bh}+\gamma^{\bar{h}}$; and a highest cost traversal includes a head only node to a body only node denoted as $c_{ij}^{\bar{h}b,h\bar{b}}=c_{ij}^{bh}+\gamma^{\bar{b}}+\gamma^{\bar{h}}$.

To further improve the above described manners of tracking objects in a multi-target environment and take advantage of the head only detection information, the body only detection information, the combination information, and the joint information to improve overall precision and recall, the exemplary embodiments output a heterogeneous set of both full body and had only detections. The data association algorithm of the exemplary embodiments in FIG. 7 is not capable of considering multiple interpretations of how root and part filters should be combined in each frame.

Figure 8:
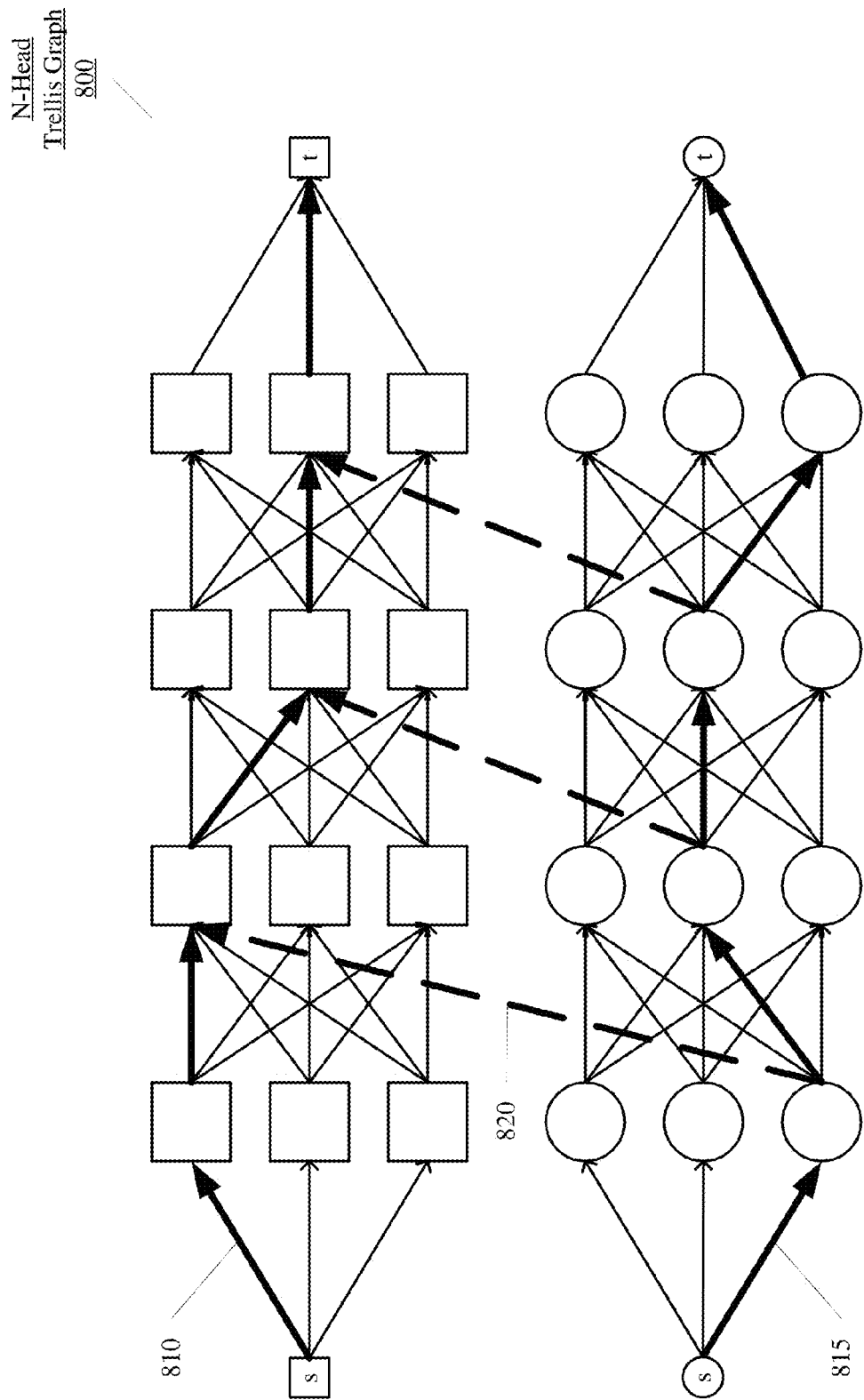
FIG. 8 shows an N-heads trellis graph incorporating heterogeneous information according to an exemplary embodiment according to an exemplary embodiment.

FIG. 8, in contrast to the above approaches, uses two trellis graphs: one trellis graph for head detections and one trellis graph for body detections. However, in contrast to the combination trellis graph approach, the tracking through the nodes is re-formulated. Specifically, the data association tracking problem is re-formulated as a task of simultaneously tracking both a head and a body that remain in a correct spatial proximity to each other (e.g., roughly tracing out a pair of parallel paths in the image plane). This joint inference is not necessarily the shortest path through the head trellis graph and the shortest path through the body trellis graph.

The formulation according to the exemplary embodiments utilizes a similar mechanism as coupled Hidden Markov Models which those skilled in the art will understand have no efficient exact inference algorithms. Thus, an approximation of an optimal solution is desired. First, heads and bodies are detected in each frame, and tracked over short temporal intervals using normalized cross correlation or linear assignment (e.g., Hungarian). Second, an N-heads algorithm is adapted to efficiently estimate the best head/body pair that traces the shortest simultaneous paths through the head and body trellis graphs. As discussed above, this pairing may not result in the shortest path individually through the trellis graphs. However, this second step determines a shortest path through both trellis graphs. As noted above, the approach according to the exemplary embodiments further considers the paths tracking each other through the respective trellis graphs.

The approach according to the exemplary embodiments focuses specifically on multimodal input data generated by head and body object detectors. Although the above noted approaches have simultaneously incorporated varieties of visual features, the tracking problem is handled using a homogeneous data source. As discussed above in one example, heads may be detected at a fairly sparse temporal sampling such as every one second. Kanade Lucas Tomasi (KLT) feature tracks may be used to compute the affinity between a pair of head detections because the detection data does not have sufficient temporal density to compute kinematic motion features from the detections directly. Similarly in another example, edgelet features of the human body may be detected but then fused together in each frame to determine whether there is enough visual evidence to hypothesize a body detection.

In contrast, the exemplary embodiments utilize multi-object tracking with heterogeneous visual features as a data fusion problem. In a specific aspect, a weak spring model from DPMs may be adopted to define the relationship between a head detection and a corresponding body detection such that an objective is to track a particular head/body pair for the spring deformation cost to be minimal over the temporal sequence. Following a standard tracking-by-detection approach, the data association problem may be formulated using two separate trellis graphs, one for heads and one for bodies. An edge $e_{ij}$ within either of the trellis graphs from a node i to a node j encodes a likelihood that the two detections correspond to the same object (i.e., the same head or the same body). When the input data is homogeneous, a single trellis graph is constructed and the data association problem maybe optimally solved using K-shortest paths. However, the exemplary embodiments do not run K-shortest paths on each trellis graph in isolation since that may find the best head trajectory and the best body trajectory but may in fact correspond to completely different objects.

By formulating a single trellis graph (including a first trellis graph for the head detections and a second trellis graph for the body detections) that describes the Cartesian product (i.e., each node represents a particular head/body pairing at a particular time t), an affinity of each head/body pair of detections corresponding to the same object may be measured. However, the width of the trellis graph grows exponentially with the number of objects. Furthermore, a greedy successive shortest path algorithm may be used because mutual exclusion constraints may be enforced. That is, if the shortest path passes through a head i and a body j at a time t, all other head/body nodes at time t which include either head i or body j may be removed from the graph before running the shortest path algorithm again to determine the tracking of the next object.

The exemplary embodiments modify an N-heads dynamic programming algorithm for solving coupled Hidden Markov Models to find an approximately optimal pair of head and body trajectories that remain close to each other over the sequence via the trajectory association engine 150. That is, the objects track each other through the trellis graph. For simplicity, the approach according to the exemplary embodiments is referred to as the N-Heads approach. In contrast to other shortest path algorithms, the N-heads approach tracks both a main and a corresponding sidekick path through the pair of trellis graphs. The sidekick path may be considered a path from a node of a second trellis graph at a first time to a node of a second trellis graph at a subsequent time. When determining the node of the main path at the subsequent time instant, the algorithm considers the node of the main path in the first trellis graph at the previous time along with the node in the sidekick path in the second trellis graph at the previous time instant as well.

For example, when tracing a subsequent step of the shortest path through the head trellis graph from t−1 to t, the algorithm may investigate all possible head/head transitions from t−1 to t. For each head detection at t−1, the best body assignment at t is computed. Then, for each head detection at t, the best combination of previous head and current body detections are determined. The same process may be applied to the body trellis graph and the optimal path corresponds to the shortest path of either graph.

Since the selection of each head at time t−1 and the sidekick at time t−1 and the connected sidekick node at time t is mutually dependent, an iteration may be taken over any combination of these three components to determine a minimum cost (via the cost engine 140). The complexity of this setting is $O(N^3)$ and may also result in divergence of the two paths in the two trellis graphs. In the N-heads algorithm, the selection of the head and the sidekick at time t may be pre-determined from previous iteration t−1. It should be noted that for the first time frame, an exhaustive search may be used as there are no previous iterations at this stage.

Formally, the N-heads algorithm determines a shortest path in the first trellis graph $T_1$ for node $n_i^t$ at time t from all connected nodes at time t−1. The sidekick node $n_j^s$ for each connected node $n_j$ may be determined in previous iteration time t−1. Thus, the minimum cost at node in trellis graph $T_1$ may be calculated with the following:

$$c(n_i) = \min_j [c(n_j) + c_{ij} + c_{i,j}^s]$$

where $c_{ij}$ is an edge cost within the network $T_1$ and $c_{ij}^x$ a cost of sidekick from $T_2$ to $T_1$. Once the shortest path is found for node $n_i$, the N-heads algorithm may fix the assignment found for the best sidekick at time t. Using this procedure, the complexity at each iteration is reduced to $O(N^2)$ since an iteration need only be taken over nodes $n_j$ at time t in trellis graph $T_1$ and nodes $n_j^s$ at time t in trellis graph $T_2$. After computing the shortest path cost for node $n_i$ in network $T_1$ at time t, a pair of nodes $(n_i, n_i^s)$ for networks $T_2$ and $T_1$ may be achieved.

The above formulation of the N-heads trellis graph is illustrated in FIG. 8. FIG. 8 shows a second N-heads trellis graph 800 incorporating heterogeneous information according to an exemplary embodiment. The N-heads trellis graph 800 shows a manner of determining two consistent shortest paths in two trellis graphs. The solid line 810 shows a shortest path in the head trellis graph whereas the solid line 815 shows a shortest path in the body trellis graph. The dashed lines 820 shows the sidekicks between the two trellis graphs for each node at the different time frames for the shortest paths of the solid lines 810, 815.

The edge cost between a pair of nodes is based upon a temporal consistency between corresponding detections using a function of displacement defined as $c_{ij}=\exp(-d^2/\sigma^2)$. The N-heads algorithm may use only motion consistency to reduce the complexity of the model. However, it should be noted that a weighted similarity of multiple features may also be used. To handle missed detections in data association, every node in each trellis graph is connected to source and sink terminals with the cost of birth $c_b$ and death $c_d$. With these edges, every detection may potentially be a start and end of a shortest path through the trellis graph. With this mechanism, if there are no detections for a long period of time (e.g., due to object occlusion or lost among clutter), the trajectory may terminate at a last good detection. The trajectory may start again when the object is reliably detected once again. However, the identity association may be lost during the break between the two trajectories.

Figure 5B:
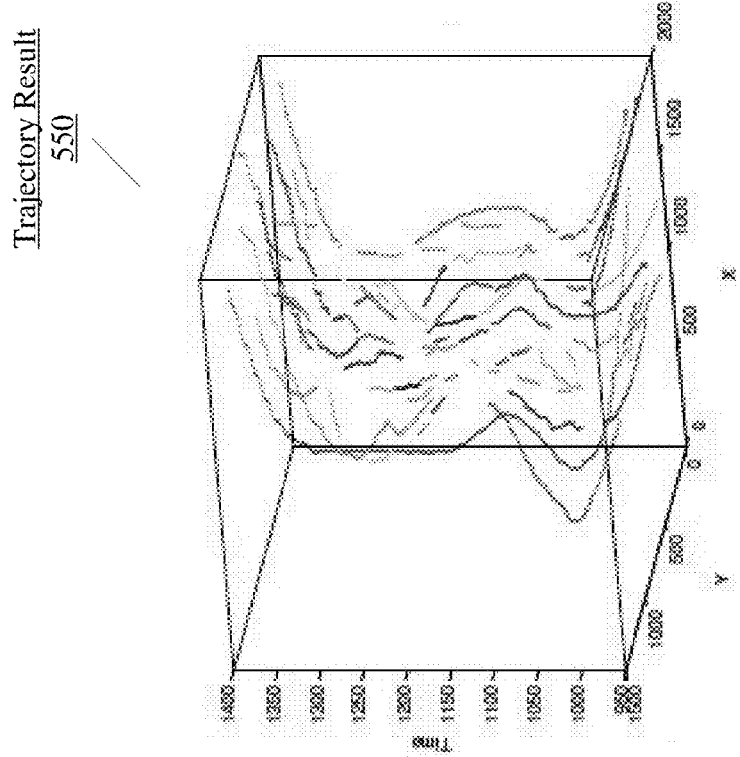
FIGS. 5A-B show trajectory results based upon homogeneous object tracking information.
Figure 5A:
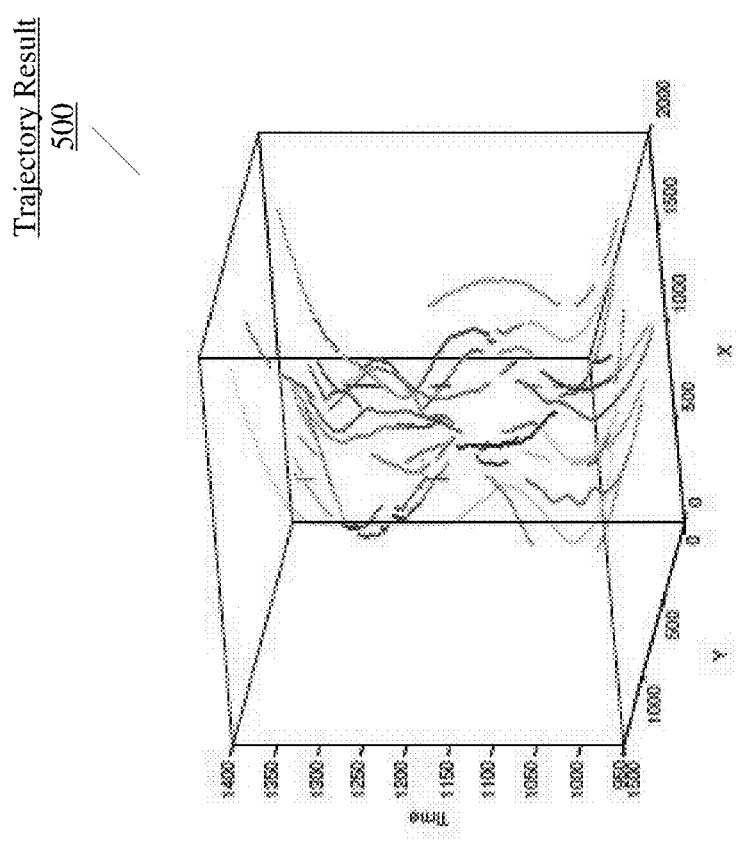
Figure 9:
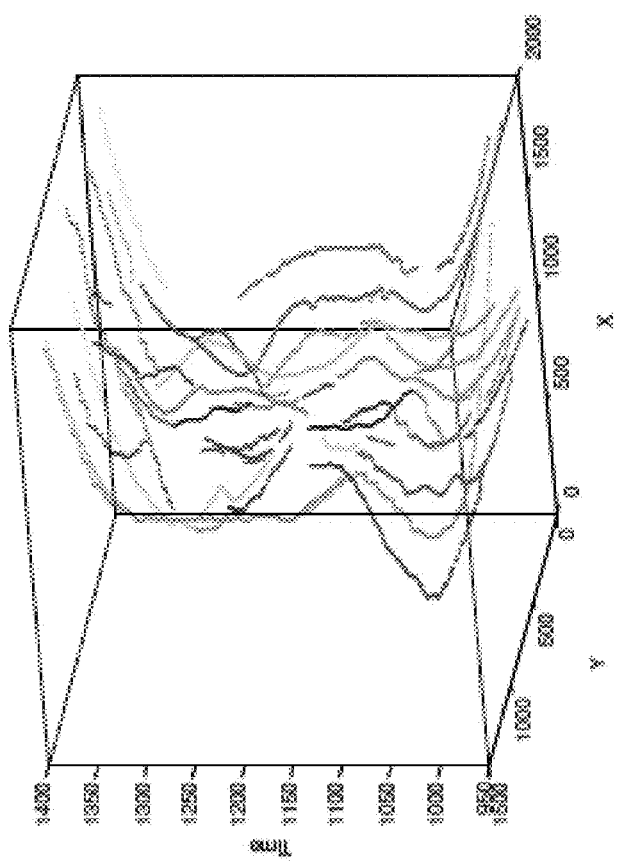
FIG. 9 shows trajectory results based upon heterogeneous object tracking information according to an exemplary embodiment according to an exemplary embodiment.

FIG. 9 shows trajectory results 900 based upon heterogeneous object tracking information according to an exemplary embodiment. By tracking objects using the above described N-heads algorithm and through data association to utilize heterogeneous object tracking information, the tracking of objects may have even further improved precision and recall. The results 900 illustrate how the N-heads algorithm provides this improved precision and recall. As noted above with regard to FIGS. 5A-B, the head tracking information provided better precision and recall from the output trajectories being longer. The trajectory results 900 may be results under the same conditions as those conducted to generate the results 500, 550 of FIGS. 5A-B, respectively. The results 900 show even longer output trajectories that show even further improved precision and recall. Thus, through improvement of the tracking information that forms the basis of generating the trajectory results, the trajectory results are improved.

Figure 2B:
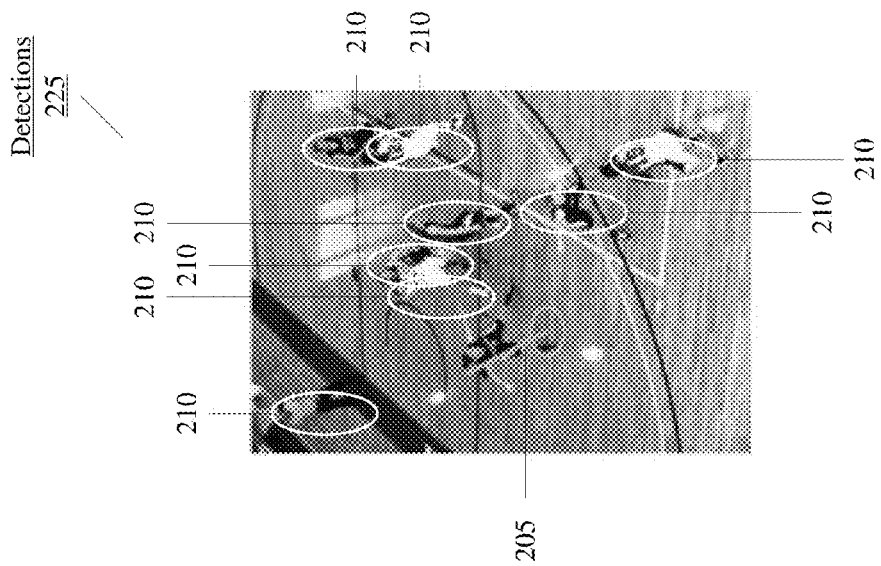
FIGS. 2A-B show first and second exemplary sets of body detections.
Figure 2A:
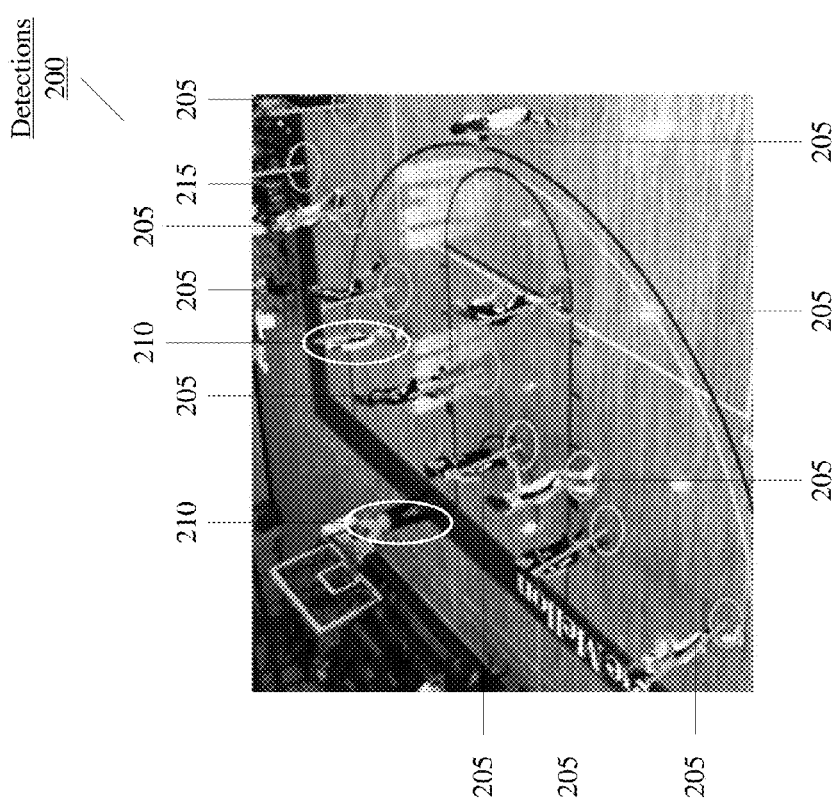
Figures 2C, 2D:
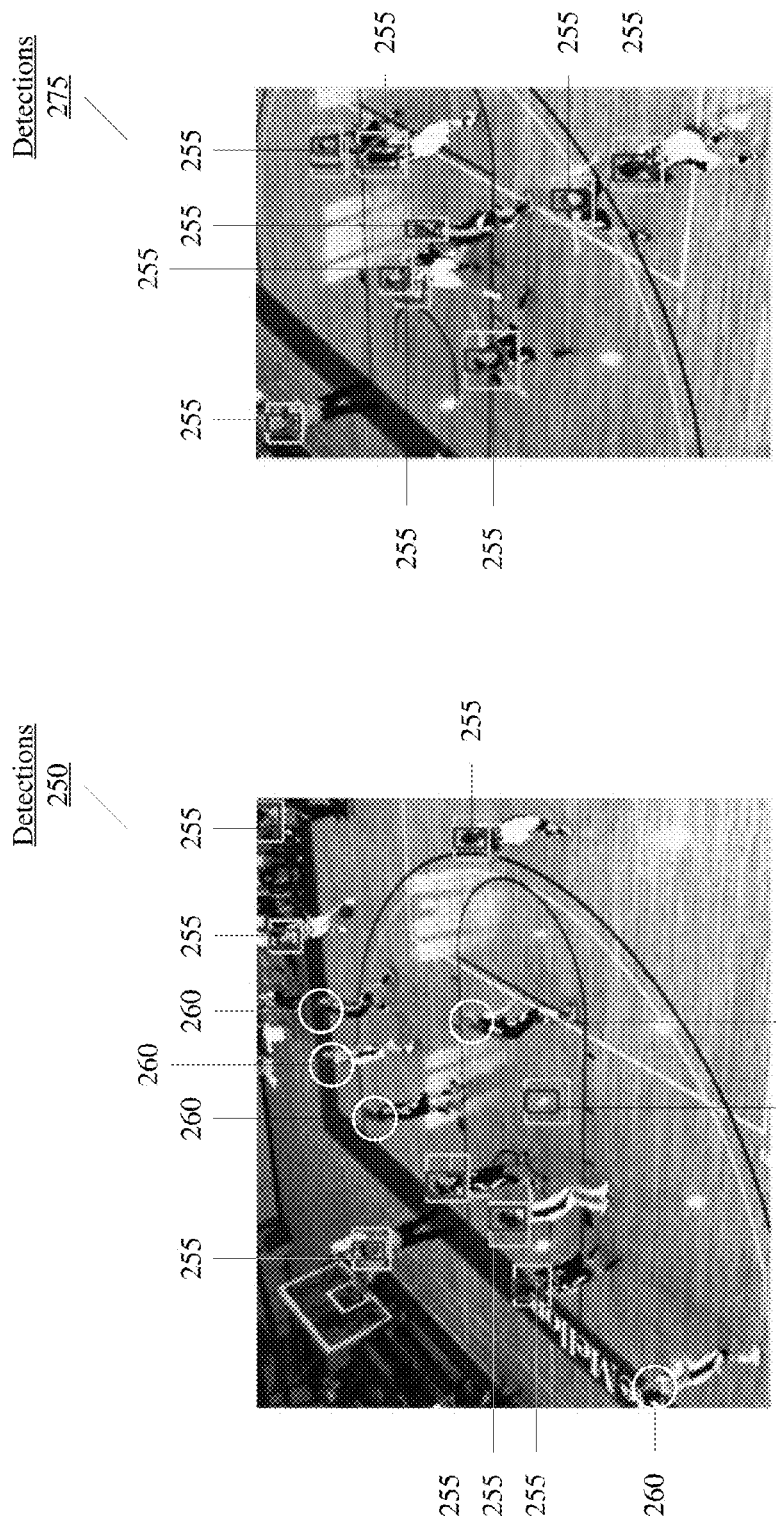
FIGS. 2C-D show first and second exemplary sets of head detections.
Figures 10A, 10B:
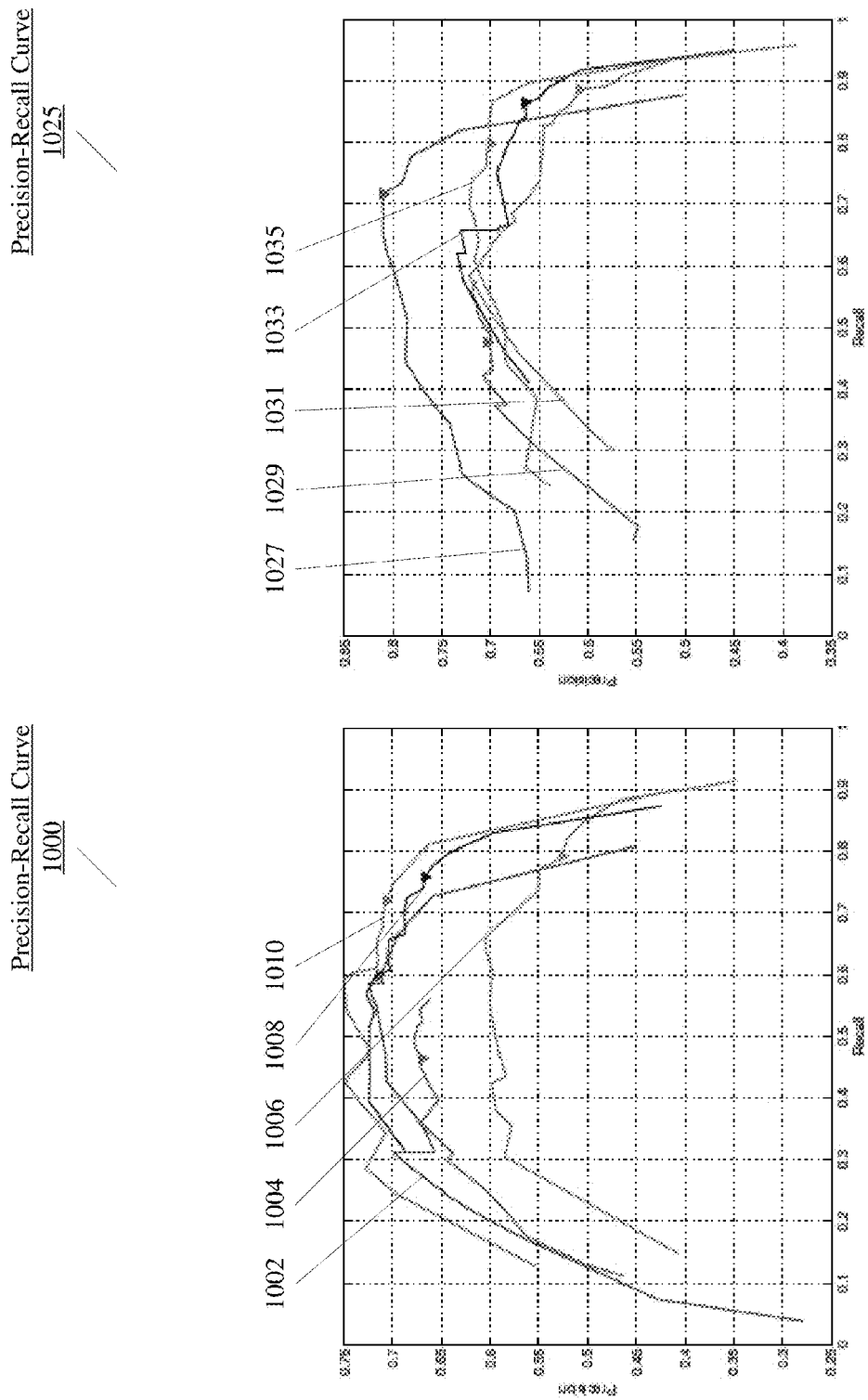
FIGS. 10A-D show first, second, third, and fourth precision-recall curves indicating results of object tracking based upon different tracking algorithms according to an exemplary embodiment.
Figure 10D:
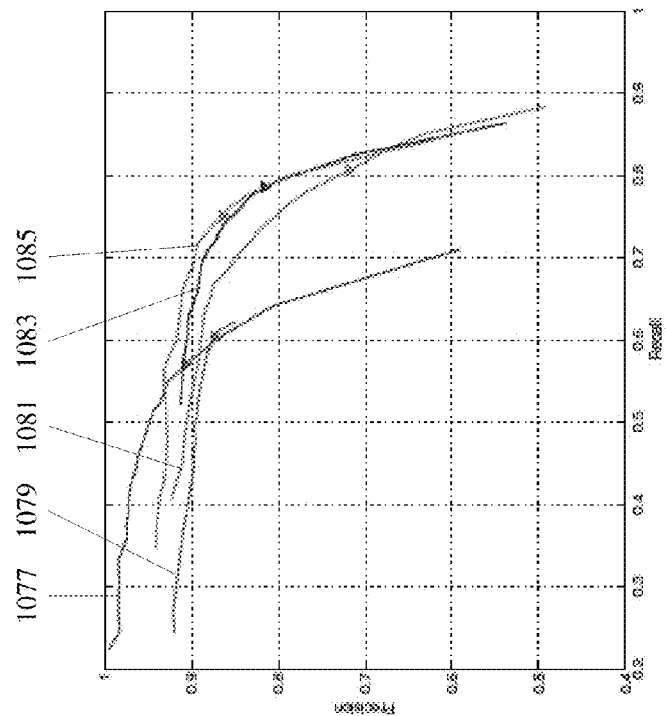
Figure 10C:
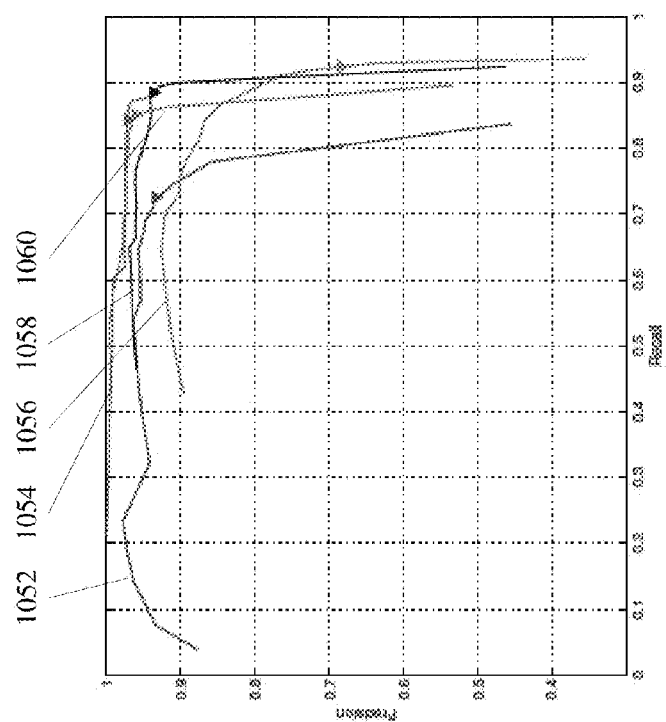

To further illustrate the improved precision and recall of trajectory results using object tracking information as determined from the N-heads algorithm according to the exemplary embodiments, experiments have been conducted on several scenarios. FIG. 10A shows a first precision-recall curve 1000 for a first basketball scenario such as that shown in FIG. 2A; FIG. 10B shows a second precision-recall curve 1025 for a second basketball scenario such as that shown in FIG. 2B; FIG. 10C shows a third precision-recall curve 1050 for a Performance Evaluation of Tracking and Surveillance (PETS 2009); and FIG. 10D shows a fourth precision-recall curve 1075 for a town center scenario. The curves 1000, 1025, 1050, 1075 also show results from using the above described approaches of object tracking including the head only tracking, the body only tracking, the combination tracking, and the joint tracking. Thus, the precision-recall curve 1000 includes a head result 1002, a body result 1004, a combination result 1006, a joint result 1008, and a N-heads result 1010 which is based upon the exemplary embodiments. The precision-recall curve 1025 includes a head result 1027, a body result 1029, a combination result 1031, a joint result 1033, and a N-heads result 1035. The precision-recall curve 1050 includes a head result 1052, a body result 1054, a combination result 1056, a joint result 1058, and a N-heads result 1060. The precision-recall curve 1075 includes a head result 1077, a body result 1079, a combination result 1081, a joint result 1083, and a N-heads result 1085. The maximum trajectory cost parameter has been swept in consecutive shortest path algorithms to determine a best trade-off between precision and recall of the trajectories. The triangle on each result 1002-1010, 1027-1035, 1052-1060, 1077-1085 of the curves 1000, 1025, 1050, 1075, respectively, illustrate the operating point for this parameter.

The motions of people are very non-linear and unpredictable. For example, during the basketball scenarios, the people (e.g., athletes, referees, etc.) often have extreme postures like bending over, dribbling, etc. There are also many person-person occlusions because the teams often adopt a one-on-one defensive strategy. Still further, there is background cluttering from a particular position and posture of a person at a particular time. The basketball scenario experiments were conducted using defined parameters such as a dataset having a frame size of 1456×1936 with a frame rate of 25 fps. The town center and PETS 2009 scenarios are known to those skilled in the art such as having a resolution of 1920×1080 at 25 fps for the town center and through monocular tracking sequence L1 view1 with 768×576 frame size at 7 fps for the PETS 2009.

The results are evaluated using standard Multiple Object Tracking Precision (MOTA) metrics which is a combined measure taking into account false detections or alarms ($P_{fa}$), missed detections ($P_{miss}$), and identity switches or mismatch error (mme) for a selected object. The range of mme is very small compared to number of false alarms and missed detections so the MOTA deemphasizes identity switches. Therefore, the evaluation of the results also include these errors separately along with the MOTA. TO have a better comparison among different datasets, the results are normalized by the number of objects ($N_{mme}$). A further metric $N_{gtmme}$ shows a normalized miss matches in assignment of trajectories to each ground truth identification which shows how consistently a selected object is tracked in a video. The average length (e.g., in seconds) and average purity of trajectories also show how long and consistent the selected object is tracked. A detection is counted as a true detection if it is within and pixel-wise distance of the ground truth image location.

The N-heads algorithm according to the exemplary embodiments have been compared with the other approaches described above. FIG. 11 shows numerical results 1100 of object tracking based upon different tracking algorithms. Specifically, the numerical results 1100 relate to the values of the precision-recall curves 1000, 1025, 1050, 1075 of FIGS. 10A-D, respectively. As shown, the N-heads approached obtained the best MOTA in the town center and the basketball sequences and had competitive results in the PETS 2009 dataset. The combined approach obtained a highest recall among all methods but it had lower precision. The joint approach may find a better trade-off for precision/recall but still makes mistakes in association and has lower precision compared to the N-heads approach. The N-heads approach generally has the best performance compared to the other approaches in terms of precision and recall and consequently obtains higher MOTA which is a combination of $P_{fa}$, $P_{miss}$, and mme.

The curves 1000, 1025, 1050, 1075 of FIGS. 10A-D, respectively, and the results 1100 further show the behavior of the N-heads approach compared to the other approaches by changing the maximum trajectory cost in consecutive shortest path method. The higher threshold results in more accurate trajectories (high precision) while a lower threshold produces more coverage (high recall). The same thresholds for all approaches are used in producing the results 1100. The graphs of FIGS. 10A-D show that the N-heads approach according to the exemplary embodiments achieve better precision/recall trade-off in almost every value of this parameter. Specifically, the N-heads approach obtained a MOTA of 0.630 in the town center dataset which is an improvement to the other approaches which obtained a MOTA of, for example, 0.454 and 0.621.

Figure 12:
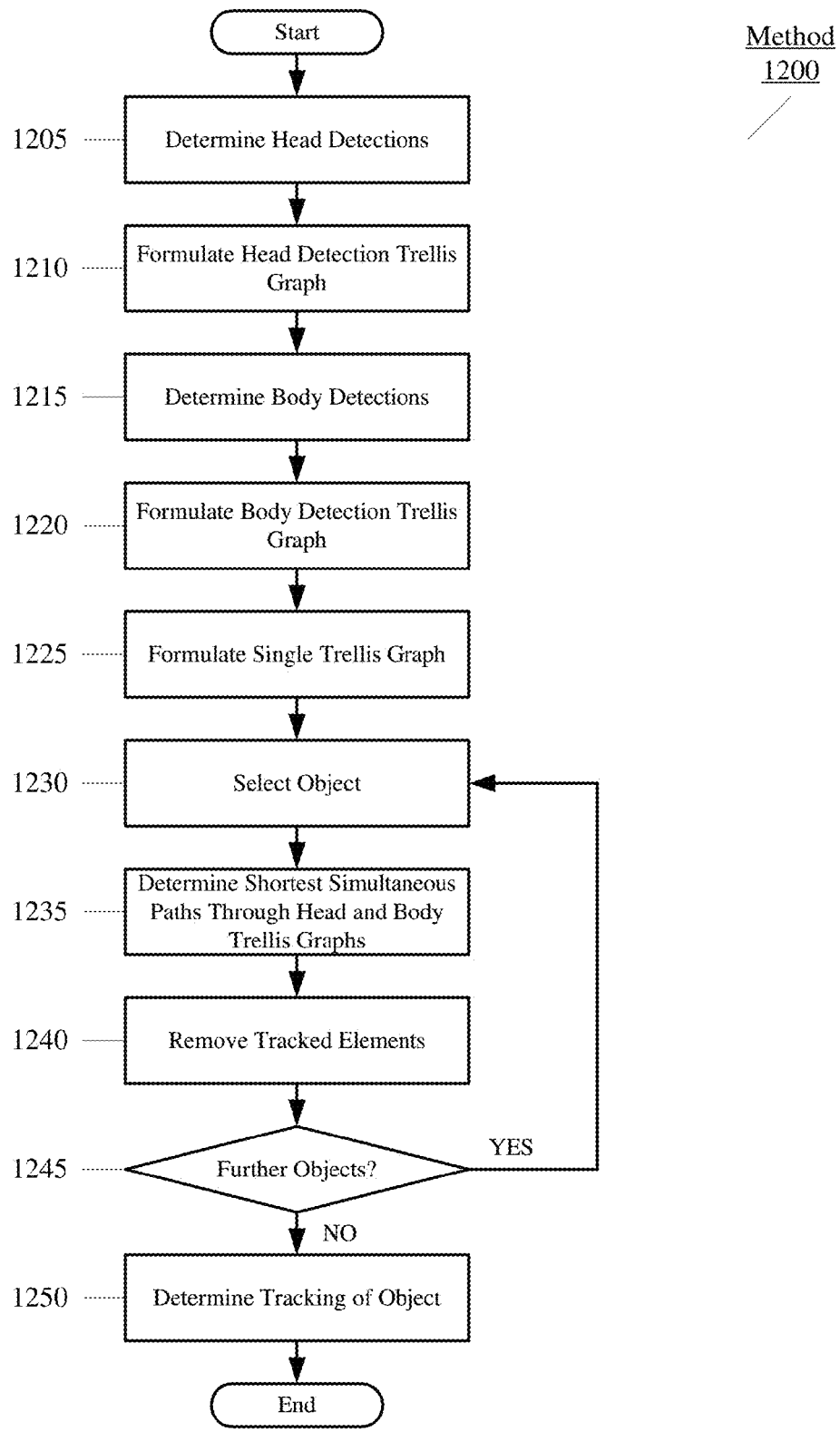
FIG. 12 shows a method of determining a tracking of an object according to an exemplary embodiment according to an exemplary embodiment.

FIG. 12 shows a method 1200 of determining a tracking of an object according to an exemplary embodiment. Specifically, the method 1200 tracks an object using the above described N-heads approach in which heterogeneous tracking information of heads and bodies is used. The method 1200 will be described with regard to the device 100 of FIG. 1 and the above described trellis graphs.

Figure 3A:
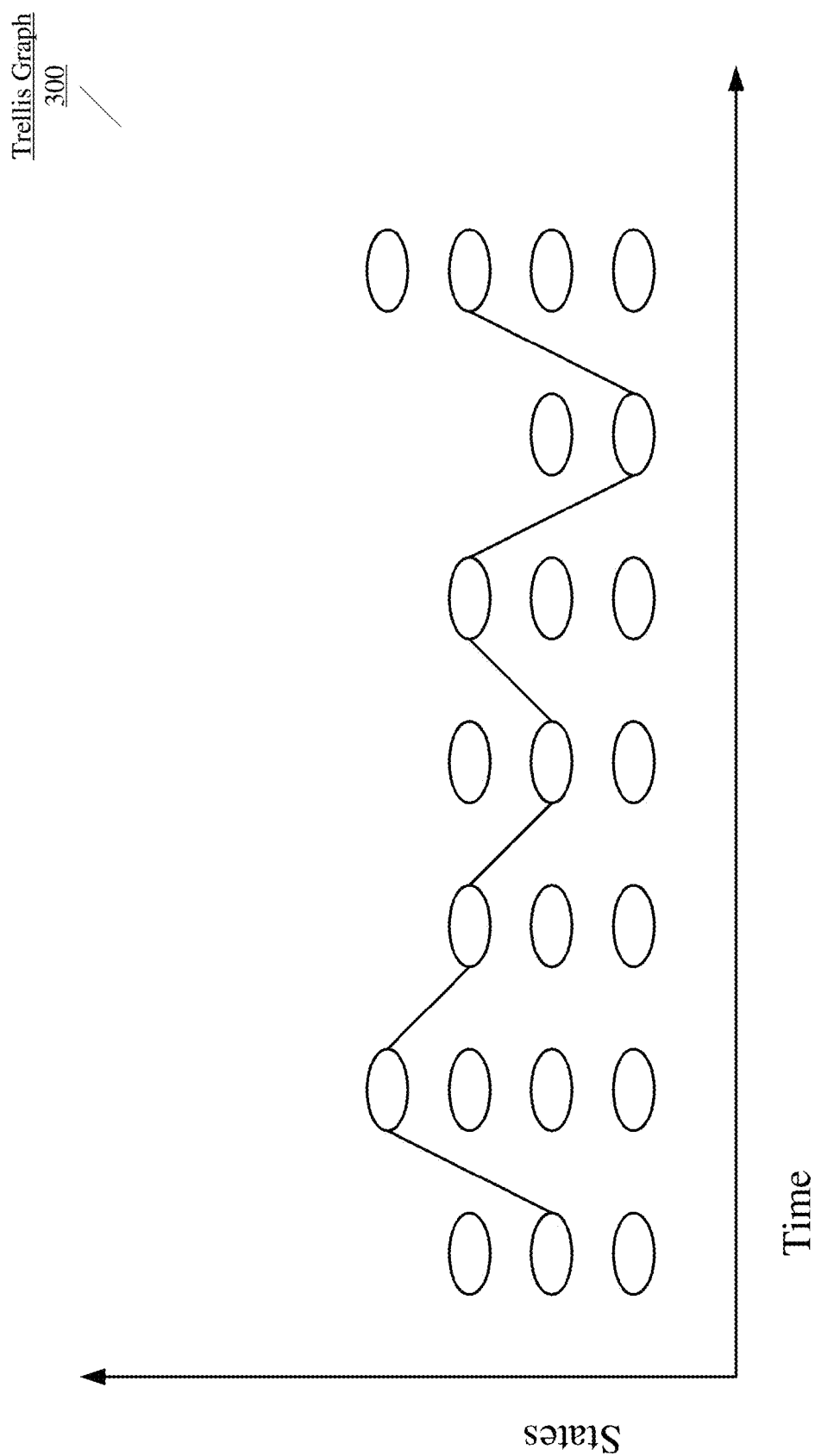
FIG. 3A shows a graphical representation of a finite state Hidden Markov model.
Figure 3B:
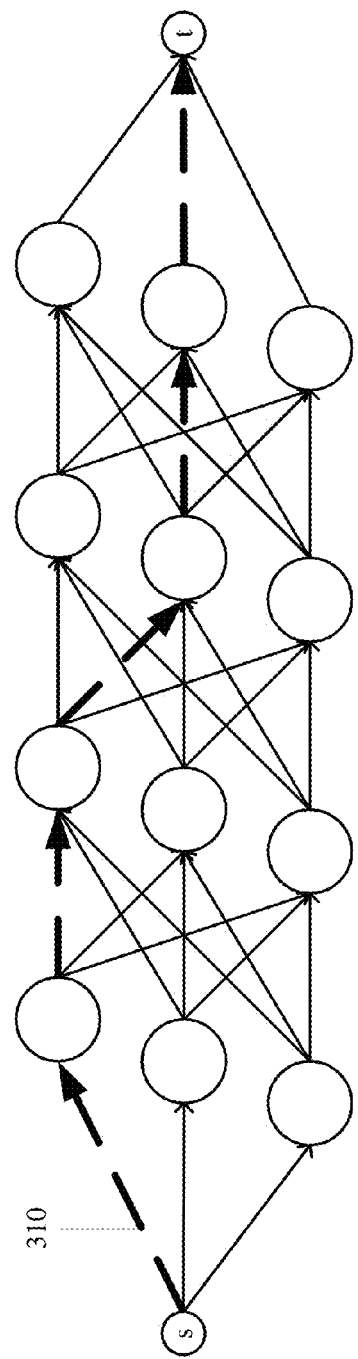
FIG. 3B shows a first trellis graph incorporating only head detection information.
Figure 3C:
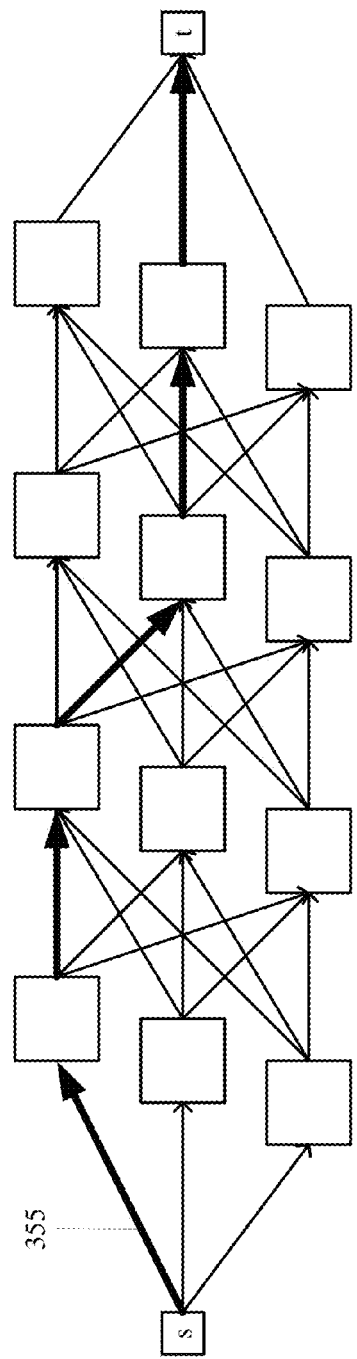
FIG. 3C shows a second trellis graph incorporating only body detection information.
Figure 4B:
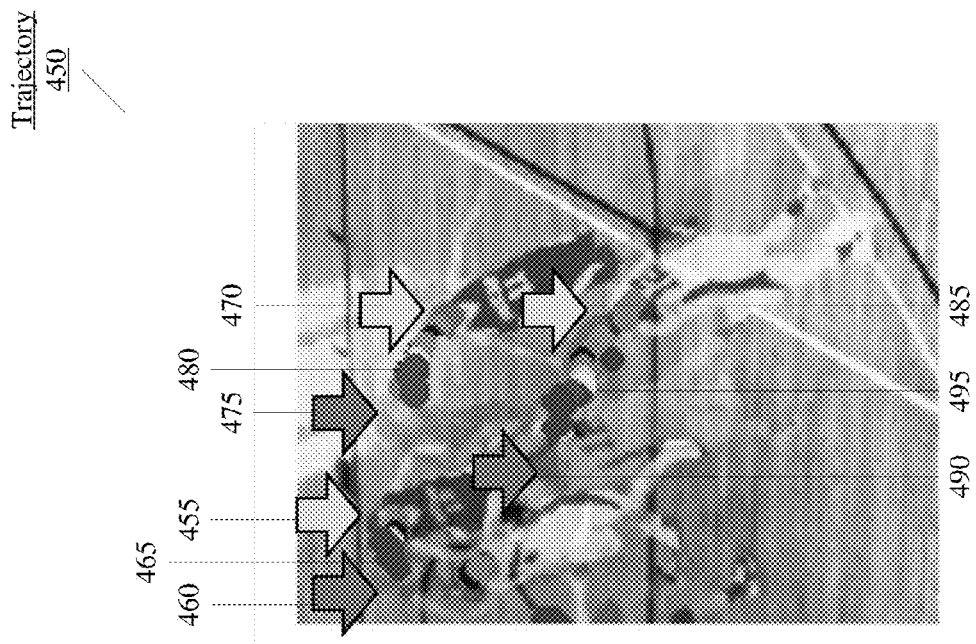
FIGS. 4A-B show first and second sets of determined trajectories based upon homogeneous object tracking information.
Figure 4A:
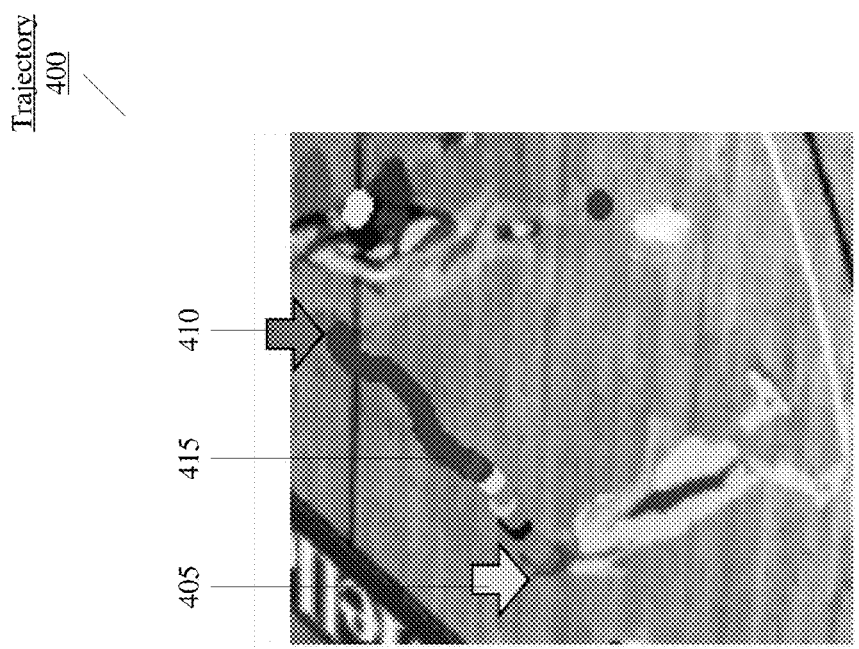

In step 1205, the device 100 determines the head detections. Specifically, the partial object tracking engine 130 receives the head information from a head detector. The partial object tracking engine 130 may identify the various heads based upon preconfigured parameters used to determine a head detection. For example, the parameters may be a bounding box for a head, a head and shoulders, etc. In step 1210, the device 100 may formulate a head detection trellis graph. In isolation, the head detection trellis graph may be substantially similar to the trellis graph 350 of FIG. 3C.

In step 1215, the device 100 determines the body detections. Specifically, the complete object tracking engine 125 receives the body information from a body detector. The complete object tracking engine 125 may identify the various bodies based upon further preconfigured parameters used to determine a body detection. For example, the parameters may be determining feet in an image plane and a hallucinated head at a predetermined length extending from the feet. In step 1220, the device 100 may formulate a body detection trellis graph. In isolation, the body detection trellis graph may be substantially similar to the trellis graph 300 of FIG. 3B.

In step 1225, the device 100 formulates a single N-heads trellis graph including the head detection trellis graph and the body detection trellis graph. Thus, the N-heads trellis graph may be similar to the combination trellis graph 605 in structure with two sets of states. Furthermore, the N-heads trellis graph may be similar to the joint trellis graph 700 of FIG. 7. That is, the N-heads trellis graph may be a varying number of nodes at each time frame. Furthermore, the N-heads trellis graph removes the constraints used in the combination trellis graph of discrete steps and a finite fixed number of steps. Specifically, the detection association engine 145 and the trajectory association engine 150 may be used to determine interconnections between the head and body trellis graphs to identify the sidekicks of the nodes.

In step 1235, the device 100 receives an input for an object to be tracked. In step 1235, the device 100 (such as the trajectory engine 135 and/or the cost engine 140) determines shortest simultaneous paths through the head and body trellis graphs. Thus, the device 100 may determine the shortest paths through each individual trellis graph of the N-heads trellis graph to result in the solid lines 810, 815. Furthermore, the sidekicks 820 for the selected object may be used to further identify the simultaneous shortest paths that track each other through the trellis graphs. The cost engine 140 may provide the various analyses for any attempt to determine the least cost for a particular solution to determine the tracking of the object having a highest probability of being correct.

In step 1240, the device 100 may remove the tracked elements since a solution for the tracking of the selected object has been determined. By removing the tracked elements, any iteration of the process becomes less complex. The N-heads trellis graph and the included head and body trellis graphs may be updated. Thus, in step 1245, the device 100 determines whether any further objects are to be tracked. If a further object is to be tracked, the device 100 returns the method 1200 to step 1230. In step 1250, the device 100 determines the tracking of the object(s).

It should be noted that the above described N-heads approach may include a variety of different modifications. For example, the other approaches may be utilized in conjunction with the N-heads approach. Specifically, the above description provides a shortest path through each of the head and body trellis graphs. An assumption may be that the shortest path utilizes only head detection information in determining the shortest head path while only utilizing body detection information in determining the shortest body path. The device 100 may further be configured to determine the shortest path based upon the combination approach and/or the joint approach. As is the case in determining trajectories, a greater accuracy or reliability of base information further improves results. Thus, the device 100 may also use the shortest paths as determined by the head only approach, the body only approach, the combination approach, the joint approach, and any combination thereof.

It should thus be noted that the method 1200 may include further steps. For example, the method 1200 may include additional steps that incorporate the other above described approaches. The method 1200 may include a set of steps that determine the shortest simultaneous path based upon the shortest path approaches. The cost engine 140 may then determine which combination of shortest paths through the trellis graphs provides the most optimal solution to the tracking of the selected object.

The exemplary embodiments provide a method and device for tracking an object in a multi-target tracking environment in which multiple detections sources are coupled. In contrast to previous approaches that use homogeneous information, the N-heads approach according to the exemplary embodiments utilizes heterogeneous information. Specifically, a shortest path through a first trellis graph and a shortest path through a second trellis graph are fused such that a simultaneous shortest path that satisfies further criteria is identified. Accordingly, it is not necessary that the shortest path found for each trellis graph corresponds to the ultimate shortest path found in the simultaneous solution.

Complete object detections are often quite reliable but may occur relatively infrequently in crowded or cluttered scenes from increased missed detections. That is, a detection from the complete object detector has a high likelihood of being a positive detection. Object part detectors often have a much higher recall but typically fire on background clutter as well that lowers precision by increasing false detections. That is, a detection from the complete object detector has a lower likelihood of being a positive detection. The N-heads algorithm according to the exemplary embodiment fused multiple sources of information for reliable data association tracking. Although part-based reasoning has been used in object tracking, the decisions were made in a greedy fashion early so that any data association only needed to operate on a single source of information. Standard data association has been extended to handle a variety of different data sources simultaneously. Instead of tracking objects through a single trellis graph, the N-heads approach according to the exemplary embodiments constructed trellis graphs for head only and full body detections. A modified N-heads algorithm may be used to efficiently determine a simultaneous pair of trajectories through each trellis graph that also tracked each other.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
    receiving first detection information for a plurality of objects, the first detection information relating to a first characteristic of the objects;
    receiving second detection information for the objects, the second detection information relating to a second characteristic of the objects;
    determining first detections based upon the first detection information and second detections based upon the second detection information;
    formulating a first trellis graph for the first detections and a second trellis graph for the second detections, the first and second trellis graphs including corresponding first and second nodes at a plurality of time frames; and
    determining a tracking of a selected one of the objects based upon a simultaneous shortest path for the selected object through both the first and second trellis graphs based upon a first path through the first trellis graph, a second path through the second trellis graph, and sidekick information between a selected node of one of the first and second trellis graphs at a selected time frame with at least one node of the other one of the first and second trellis graphs at a previous time frame.

2. The method of claim 1, wherein the object is a person, the first characteristic is a full body, and the second characteristic is a head.

3. The method of claim 2, further comprising:
    formulating a complete trellis graph including the first and second trellis graphs and the sidekick information, the complete trellis graph being a Cartesian product with each node is a head-body pairing at a particular time frame.

4. The method of claim 1, wherein a number of nodes at a particular time frame for the first and second trellis graphs varies.

5. The method of claim 4, wherein the nodes at the particular time frame includes a missed node.

6. The method of claim 5, wherein the sidekick information for the selected node of one of the first and second trellis graphs at the selected time frame indicates a first node at an immediately prior time frame and a second node at a further time frame previous to the immediately prior time frame.

7. The method of claim 6, wherein the sidekick information for nodes of the first and second trellis graphs at a first time frame uses an exhaustive search.

8. The method of claim 2, wherein the first and second paths are based upon a fully body only detection information, a head only detection information, a combination detection information, a joint detection information, and a combination thereof.

9. The method of claim 3, further comprising:
    removing nodes in the complete trellis graph corresponding to the simultaneous shortest path; and
    determining a further tracking of a further selected one of the objects based upon a further simultaneous shortest path for the further selected object through both the first and second trellis graphs based upon a further first shortest path through the first trellis graph, a further second shortest path through the second trellis graph, and the sidekick information, the further simultaneous shortest path including a further trajectory correspondence between the further first and further second shortest paths.

10. The method of claim 1, wherein the tracking increases a probability that one of the first detections and one of the second detections correspond to the same selected object.

11. A device, comprising:
    a processor coupled to a memory, wherein the processor is programmed to determine a tracking of a selected one of a plurality of objects by:
        receiving first detection information for the objects, the first detection information relating to a first characteristic of the objects;
        receiving second detection information for the objects, the second detection information relating to a second characteristic of the objects;
        determining first detections based upon the first detection information and second detections based upon the second detection information;
        formulating a first trellis graph for the first detections and a second trellis graph for the second detections, the first and second trellis graphs including corresponding first and second nodes at a plurality of time frames; and
        determining the tracking of the selected object based upon a simultaneous shortest path for the selected object through both the first and second trellis graphs based upon a first path through the first trellis graph, a second path through the second trellis graph, and sidekick information between a selected node of one of the first and second trellis graphs at a selected time frame with at least one node of the other one of the first and second trellis graphs at a previous time frame.

12. The device of claim 11, wherein the object is a person, the first characteristic is a full body, and the second characteristic is a head.

13. The device of claim 12, wherein the processor is further programmed to determine a tracking of a selected one of a plurality of objects by:
    formulating a complete trellis graph including the first and second trellis graphs and the sidekick information, the complete trellis graph being a Cartesian product with each node is a head-body pairing at a particular time frame.

14. The device of claim 11, wherein a number of nodes at a particular time frame for the first and second trellis graphs varies.

15. The device of claim 14, wherein the nodes at the particular time frame includes a missed node.

16. The device of claim 15, wherein the sidekick information for the selected node of one of the first and second trellis graphs at the selected time frame indicates a first node at an immediately prior time frame and a second node at a further time frame previous to the immediately prior time frame.

17. The device of claim 16, wherein the sidekick information for nodes of the first and second trellis graphs at a first time frame uses an exhaustive search.

18. The device of claim 12, wherein the first and second paths are based upon a fully body only detection information, a head only detection information, a combination detection information, a joint detection information, and a combination thereof.

19. The device of claim 13, wherein the processor is programmed to determine a further tracking of a further selected one of the objects by:
   removing nodes in the complete trellis graph corresponding to the simultaneous shortest path; and
   determining the further tracking of the further selected object based upon a further simultaneous shortest path for the further selected object through both the first and second trellis graphs based upon a further first shortest path through the first trellis graph, a further second shortest path through the second trellis graph, and the sidekick information, the further simultaneous shortest path including a further trajectory correspondence between the further first and further second shortest paths.

20. A non-transitory computer readable storage medium with an executable program stored thereon, wherein the program instructs a microprocessor to perform operations comprising:
   receiving first detection information for a plurality of objects, the first detection information relating to a first characteristic of the objects;
   receiving second detection information for the objects, the second detection information relating to a second characteristic of the objects;
   determining first detections based upon the first detection information and second detections based upon the second detection information;
   formulating a first trellis graph for the first detections and a second trellis graph for the second detections, the first and second trellis graphs including corresponding first and second nodes at a plurality of time frames; and
   determining a tracking of a selected one of the objects based upon a simultaneous shortest path for the selected object through both the first and second trellis graphs based upon a first path through the first trellis graph, a second path through the second trellis graph, and sidekick information between a selected node of one of the first and second trellis graphs at a selected time frame with at least one node of the other one of the first and second trellis graphs at a previous time frame.

* * * * *